United States Patent
Fukuda et al.

(10) Patent No.: US 7,056,615 B2
(45) Date of Patent: Jun. 6, 2006

(54) ELECTRODE FOR POLYMER ELECTROLYTE FUEL CELLS AND MANUFACTURING METHOD THEREFOR

(75) Inventors: Kaoru Fukuda, Wako (JP); Yuichiro Sugiyama, Wako (JP); Shinya Watanabe, Wako (JP); Chikara Iwasawa, Wako (JP); Tadahiro Shiba, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 336 days.

(21) Appl. No.: 10/280,074

(22) Filed: Oct. 25, 2002

(65) Prior Publication Data

US 2003/0091890 A1 May 15, 2003

(30) Foreign Application Priority Data

Nov. 2, 2001 (JP) .............................. 2001-337343

(51) Int. Cl.
 *H01M 4/90* (2006.01)
 *H01M 4/92* (2006.01)

(52) U.S. Cl. ........................... 429/40; 29/623.1; 429/42
(58) Field of Classification Search ................. 429/40, 429/42
 See application file for complete search history.

(56) References Cited

U.S. PATENT DOCUMENTS

| | | | | |
|---|---|---|---|---|
| 3,425,875 A | * | 2/1969 | Pond et al. ................. | 502/101 |
| 4,163,811 A | * | 8/1979 | Kohlmayr et al. .......... | 427/115 |
| 4,425,261 A | * | 1/1984 | Stenius et al. ............. | 502/339 |
| 4,714,693 A | * | 12/1987 | Targos ....................... | 502/261 |
| 4,927,514 A | * | 5/1990 | Solomon et al. ........... | 204/242 |
| 5,795,669 A | * | 8/1998 | Wilkinson et al. .......... | 429/40 |
| 5,879,715 A | * | 3/1999 | Higgins et al. ............. | 424/489 |
| 6,017,650 A | * | 1/2000 | Ramunni et al. ............ | 429/42 |
| 6,066,410 A | * | 5/2000 | Auer et al. .................. | 429/40 |
| 6,083,467 A | * | 7/2000 | Takeshima et al. ......... | 423/335 |
| 6,660,680 B1 | * | 12/2003 | Hampden-Smith et al. . | 502/180 |
| 6,706,795 B1 | * | 3/2004 | Garti et al. ................. | 524/431 |

FOREIGN PATENT DOCUMENTS

| | | |
|---|---|---|
| DE | 198 04 587 A1 | 8/1998 |
| DE | 197 56 880 A1 | 7/1999 |
| DE | 698 00 361 T2 | 5/2001 |
| JP | 5-258775 | 10/1993 |

OTHER PUBLICATIONS

"The Preparation of Monodisperse Colloidal Metal Particles from Microemulsions", Boutonnet et al, *Colloids and Surfaces*, vol. 5, 1982, pp. 209-225.
German Search Report with English translation.

* cited by examiner

*Primary Examiner*—Mark Ruthkosky
(74) *Attorney, Agent, or Firm*—Arent Fox PLLC

(57) ABSTRACT

In an electrode for polymer electrolyte fuel cells comprising electron conducting particles carrying platinum and an ion conducting polymer, platinum particles formed by a microemulsion method are added in a range of from 5 to 20% of the total amount of platinum in the electrode. A manufacturing method therefor is also provided.

5 Claims, 2 Drawing Sheets

ELECTRODE FOR POLYMER ELECTROLYTE FUEL CELLS AND MANUFACTURING METHOD THEREFOR

BACKGROUND OF THE INVENTION

1. Technical Field

The present invention relates to an electrode for polymer electrolyte fuel cells, and in particular, relates to a technique in which a catalyst functions efficiently.

2. Background Art

A polymer electrolyte fuel cell is formed by laminating separators at both sides of a tabular membrane electrode assembly (MEA). The membrane electrode assembly is generally a laminated body having a polymer electrolyte membrane placed between a cathode side catalytic layer and an anode side catalytic layer, and having a gas-diffusion layer laminated at the outside of each catalytic layer. In such a fuel cell, hydrogen gas supplied through a separator plate arranged at the cathode side and an oxidizing gas supplied through a separator plate arranged at the anode side electrochemically react and thereby generate electricity.

During operation of the fuel cell, electrons generated in an electrochemical reaction are conducted between an electrode catalytic layer and a separator, and at the same time, fuel gas and oxidizing gas are diffused through a gas-diffusion layer. In an electrode catalytic layer of the anode, fuel gas reacts and generates protons and electrons, and in an electrode catalytic layer of the cathode, oxygen, protons, and electrons react and generate water. An electrolyte membrane conducts protons and thereby generate electricity through the electrode catalytic layer of the anode and the cathode.

In the anode side, protons and electrons are generated under coexistent conditions of a catalyst, electron conducting particles, and an electrolyte. That is to say, hydrogen gas is reduced under conditions in which an electrolyte which conducts protons, electron conducting particles which conducts electrons, and a catalyst coexist.

An electrode catalytic layer is generally formed by a method in which electron conducting particles carrying catalyst particles on their surfaces such as Pt, and an electrolyte comprising an ion conducting polymer, are mixed together in a solvent to form a catalyst paste, and this catalyst paste is coated on a membrane, a carbon paste, or a tetrafluoroethylene-hexafluoropropylene copolymer (FEP) sheet, and is dried. Therefore, generation efficiency tends to be increased as the amount of a catalyst carried by the electron conducting particles is increased. Both the cathode and the anode show the same tendency as described above.

However, in a conventional electrode for fuel cells as described above, utilization ratio of catalyst metal on electron conducting particles carrying catalyst is low, and an excessive amount of carried catalyst must be used. Furthermore, because this catalyst is composed of a rare metal such as Pt, the manufacturing cost of the fuel cell is increased as the amount of the catalyst carried by electron conducting particles is increased.

Therefore, an object of the present invention is to provide an electrode for polymer electrolyte fuel cells in which generation efficiency can be improved without increasing the amount of catalyst carried by electron conducting particles. Furthermore, an object of the present invention is to provide a method of producing electrodes for polymer electrolyte fuel cells efficiently.

SUMMARY OF THE INVENTION

The characteristics of the electrode for polymer electrolyte fuel cells of the present invention are that platinum particles formed by a microemulsion method are added in the electrode for polymer electrolyte fuel cells comprising electron conducting particles carrying platinum and an ion conducting polymer.

FIG. 1 is a schematic diagram showing effects on the electrode for polymer electrolyte fuel cells of the present invention. As shown in FIG. 1, the electrode for polymer electrolyte fuel cells of the present invention comprises, for example, a porous material having a large number of voids 3 formed by electron conducting particles 1 and an ion conducting polymer 2. Multiple particles of Pt 4 are carried on the surface of the electron conducting particles. The most important feature of the electrode for polymer electrolyte fuel cells of the present invention is that platinum particles 5 formed by a microemulsion method are uniformly dispersed in the ion conducting polymer 2.

In the present invention, diameters of the platinum particles can be formed in a range of several nanometers by applying a microemulsion method. The platinum particles easily aggregate with each other if they are conventionally diffused in the ion conducting polymer. However, the platinum particles yielded by the method of the present invention remain stable even in the condition of fine particles, the platinum particles do not aggregate with each other even if they are mixed in the ion conducting polymer to form the catalyst paste, and they can be uniformly dispersed.

As a result, the platinum particles 5 which are uniformly dispersed in the ion conducting polymer 2 can form a conducting network with the platinum particles 4 which are carried on the electron conducting particles 1, and can allow platinum to exist in the three-phase interface efficiently. In the case in which only electron conducting particles carrying platinum are used, platinum which does not contact with the ion conducting polymer exists in excess. However, in the electrode for polymer electrolyte fuel cells of the present invention, by dispersing the platinum particles 5 in the ion conducting polymer 2 uniformly, utilization ratio of platinum can be improved, and the initial voltage of the fuel cell can be improved.

This effect is explained bellow in detail. A fuel gas such as hydrogen gas flows through voids 3, the hydrogen gas contacts with the conductive network which comprises platinum particles 4 carried around the surface of the electron conducting particles 1 and the platinum particles 5, and the hydrogen gas is reduced by platinum as a catalyst, to generate protons and electrons. The protons are conducted through the ion conducting polymer 2, and the electrons are conducted to the electron conducting particles 1 through the conductive network. Thus, in the electrode for polymer electrolyte fuel cells of the present invention, generation efficiency can be improved without increasing the amount of platinum particles 4 which is carried by the electron conducting particles 1. However, this mechanism is only one of the aspects of the present invention, and the present invention is not limited only to this effect. Around the surface of the electron conducting particle 1 means within about 10 nm from the surface of the electron conducting particle, and some platinum particles 5 seem to contact with the electron conducting particles 1.

The microemulsion method of the present invention is a method to form an extremely fine emulsion by forming micelles which include droplets of the third material in its central part. Concretely, a solution of a chloroplatinic acid is put into a mixed solution of an organic solvent and a surface active agent, reversed micelles of the surface active agent are formed in a continuous phase of the organic solvent, and droplets of the chloroplatinic acid solution are formed inside the reversed micelles. By adding a reducing agent in the mixed solution, monodisperse platinum particles having mean diameters of several nanometers are obtained in a few minutes in a reducing reaction. These platinum particles are stable because they are protected by the surface active agent. As a reference for the microemulsion method, there may be mentioned M. Boutonnet, J. Kizling, P. Stenius, and G. Maire: Preparation of Monodisperse Colloid Metal Particles from Microemulsion, Colloids Surface, 5, 197(1982).

A solvent which is used in a typical micelle forming process, is used as the solvent. However, in the microemulsion method of the present invention, it is desirable to use a paraffin-based hydrocarbon such as hexane or octane. Furthermore, as the surface active agent, it is desirable to use a non-ionic surface active agent such as pentaethyleneglycoldecyl ether (PEGDE) or polyoxyethleneoctylphenyl ether, and in particular, PEGDE is more desirable. As the reducing agent, it is desirable to use $NaBH_4$, formaldehyde, glucose, and hydrazine.

The mean diameter of the platinum particles formed by the microemulsion method described above can be freely controlled by selecting an appropriate surface active agent. However, it is desirable that they be formed in a range of from 0.5 to 5 nm, and more desirably from 2 to 4 nm, in the present invention. If the mean particle diameter is formed within the above range, the platinum particles can be diffused uniformly in the ion conducting polymer, activation points which energize fuel gas are increased, and the utilization ratio of platinum is increased.

Furthermore, in the electrode for polymer electrolyte fuel cells of the present invention, it is desirable that the platinum particles formed by the microemulsion method be contained in a range of from 5 to 20% by weight of the total platinum. In the case in which this content is less than 5%, the platinum particles cannot form a network with the platinum carried around the electron conducting particles, and the initial voltage mentioned above is no longer improved. On the other hand, in the case in which the content is more than 20%, the durability of the electrode is reduced. Concretely, during continuous discharging processes of the fuel cell, decline in voltage is observed. As a reason of this phenomenon, it is believed that the platinum particles which are dispersed in the ion conducing polymer aggregate and the particle diameters become larger.

As electron conducting particles of the present invention, for example, carbon black particles can be used. Platinum particles are carried on the surface of the electron conducting particles, and it is desirable that the mean particle diameter of these platinum particles be from 1 to 8 nm, and more desirably from 3 to 5 nm. The platinum particles which are carried on the surface of the electron conducting particles improves the utilization ratio of platinum and the initial voltage by forming an effective electron conductive network with the platinum particles which are uniformly dispersed in the ion conducting polymer.

The present invention is advantageous in the case in which the specific surface area of the electron conducting particles is more than 200 $m^2/g$. That is to say, an electron conducting particle having a large specific surface area has numerous micropores on its surface, and exhibits a good gas diffusion. The platinum particles existing in the micropores have nothing to do with the reaction because these particles are do not in contact. However, in the present invention, the platinum particles which are dispersed in the ion conducting polymer are efficiently utilized because the platinum particles do not enter into the micropores. In the present invention, both the reaction efficiency and the gas diffusion can be improved at the same time.

In contrast, in the case in which the specific surface area of the electron conducting particles is less than 200 $m^2/g$, the present invention also is advantageous. That is to say, if the specific surface area of the electron conducting particles is small, water repellency is increased and the gas diffusion of the ion conducting polymer is also increased. However, in such a case, distances among the platinum particles is reduced, and the platinum particles are easily aggregated with each other or sintered. In the present invention, it is not necessary to have the electron conducting particles carry large amounts of platinum, so such a problem can be avoided.

Fluororesin based ion exchange resin can be used as the ion conducting polymer of the present invention. It is desirable that the weight ratio of the ion conducting polymer to the electron conducting particles be less than 1.2. The amount of the ion conducting polymer is small, porosity is increased and the gas diffusion is improved. In contrast, if the electron conducting particles carrying platinum are not covered sufficiently, the activation points which energize fuel gas are decreased, and the utilization ratio of the platinum is decreased. However, in the present invention, activation overvoltage can be reduced without reducing the utilization ratio of platinum because the platinum particles contained in the ion conducting polymer supplement the activation points which energize fuel gas.

Furthermore, the characteristics of the electrode for polymer electrolyte fuel cells comprising platinum particles, electron conducting particles, and ion conducting particles of the present invention are that the electron conducting particles carrying platinum, the ion conducting polymer, and the platinum particles formed by applying the microemulsion method are used as primary materials. In this manufacturing method, the electrode for polymer electrolyte fuel cells having the superior generation efficiency described above can be produced efficiently.

Concretely, in the platinum particles obtained by the method described above, the electron conducting particles carry platinum on their surfaces, and the ion conducting polymer is mixed to form an electrode paste, and this electrode paste is processed into a sheet to form an electrode sheet. To process this into the form of a sheet, a method in which the electrode paste is coated on a film which is peeled off after a membrane electrode assembly is formed, or a method in which the electrode paste is coated on a carbon paper or an electrolyte membrane, or other methods which is already known, may be applied. In the manufacturing method of the present invention, it is desirable to apply a washing process to remove impurities, except for the platinum particles, after the electrode sheet is formed.

Next, this electrode sheet is transferred to both surfaces of the polymer electrolyte to form the membrane electrode assembly. As a method of transferring the electrode sheet, there may be mentioned a decal method in which the electrode sheet is joined with the polymer electrolyte by thermo-compression bonding.

Although platinum carried on the electron conducting particles functions as a catalyst of a fuel cell by applying reduction, this reduction process of the platinum can be applied to the electron conduction particles before the electrode is formed, or after the electrode is formed, or after the electrode sheet is formed. A method in which the electrode paste is dried and crushed into powder, the powder is reduced, and formed into paste, and the paste is formed into a sheet, can be applied. As methods of reduction, a gas phase method using reductive gas such as hydrogen or carbon monoxide, and a liquid phase method using chemicals such as $NaBH_4$, formaldehyde, glucose, and hydrazine, may be applied.

BEST MODE FOR CARRYING OUT THE INVENTION

Figure 1:
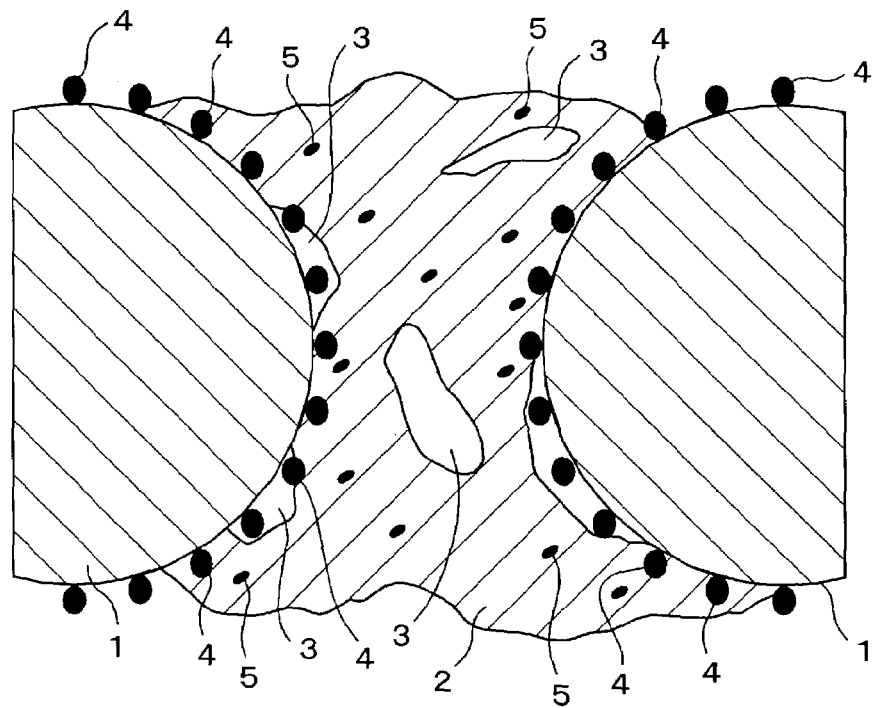
FIG. 1 is a schematic diagram showing the structure of the present invention.

Next, the present invention is explained in detail by way of examples.

1. Preparing of Platinum Particles by Microemulsion Method

Chloroplatinic acid solution was added to a mixture of hexane, pentaethyleneglycoldecyl ether (PEGDE), and water (hexane:PEGDE:water=89.0:10.3:0.4). As a result, reversed micelles were formed in the continuous phase of hexane, and droplets of chloroplatinic acid solution were formed inside the reversed micelles. The size of an entire particle was 12 nm, and the size of the droplet was 6 nm. Next, hydrazine was added in the mixture to cause reduction. The platinum particles obtained in this way were in a uniform dispersion having mean particle diameter of 3 nm.

2. Preparation of the Electrode Sheet

EXAMPLE 1

100 g of ion conducting polymer (trade name: Nafion SE5112, produced by Du Pont Kabushiki Kaisha), 7.0 g of carbon particles carrying platinum whose weight ratio of carbon black and platinum was 50:50 (trade name: TEC10E50E, produced by Tanaka Kikinzoku Kogyo K. K), and 1.5 g of platinum particles formed by the microemulsion method as described above were mixed together to form a catalyst paste. Next, this catalyst paste was coated on a sheet made of tetrafluoroethylene-hexafluoropropylene copolymer (FEP) and dried to form the electrode sheet of example 1. The amount of platinum in this electrode sheet was 0.5 mg/cm$^2$. Next, the electrode sheet was reduced in a NaBH$_4$ aqueous solution, was washed by nitric acid and water, and was dried at 100° C.

EXAMPLES 2 TO 5 AND COMPARATIVE EXAMPLE 1

Electrode sheets of Examples 2 to 5 and Comparative Example 1 were prepared in the same way as in Example 1 except that the added amount of the ion conducting polymer solution, the carbon particles carrying platinum, and the platinum particles formed by the microemulsion method, were changed.

TABLE 1

|  | Ion conducting polymer solution (g) | Carbon carrying platinum (g) | Platinum particles by microemulsion method (g) | Terminal voltage (V) (initial) | Terminal voltage (V) (after 500 hours) |
| --- | --- | --- | --- | --- | --- |
| Example 1 | 100 | 7.0 | 1.5 | 0.621 | 0.545 |
| Example 2 | 100 | 8.0 | 1.0 | 0.622 | 0.585 |
| Example 3 | 100 | 9.0 | 0.5 | 0.623 | 0.549 |
| Example 4 | 100 | 9.5 | 0.25 | 0.615 | 0.588 |
| Example 5 | 100 | 9.9 | 0.05 | 0.586 | 0.560 |
| Comparative Example 1 | 100 | 10.0 | 0 | 0.58 | 0.555 |

3. Preparing of the Membrane Electrode Assembly

The electrode sheets in Examples and Comparative Example were transferred to both surfaces of the polymer electrolyte made from Nafion by a decal method, and the membrane electrode assembly (MEA) was obtained. Transferring by a decal method means peeling the FEP sheet after the electrode sheet is joined with a polymer electrolyte by thermo-compression bonding.

4. Electric Power Generation by the Membrane Electrode Assembly

Electricity is generated by supplying hydrogen gas to one side of the membrane electrode assembly and air to the other side of the membrane electrode assembly in Examples 1 to 5 and Comparative Example 1. Each gas was supplied at 80° C. and at a humidity of 50% RH, and utilization ratio (consumed amount/supplied amount) of each gas was 50%. Initial terminal voltage and the terminal voltage after 500 hours of the generation passed were measured, and the relationships of the added amount of the platinum particles and the terminal voltages at current density 0.5 A/cm$^2$ are shown in FIGS. 2 and 3.

Figure 2:
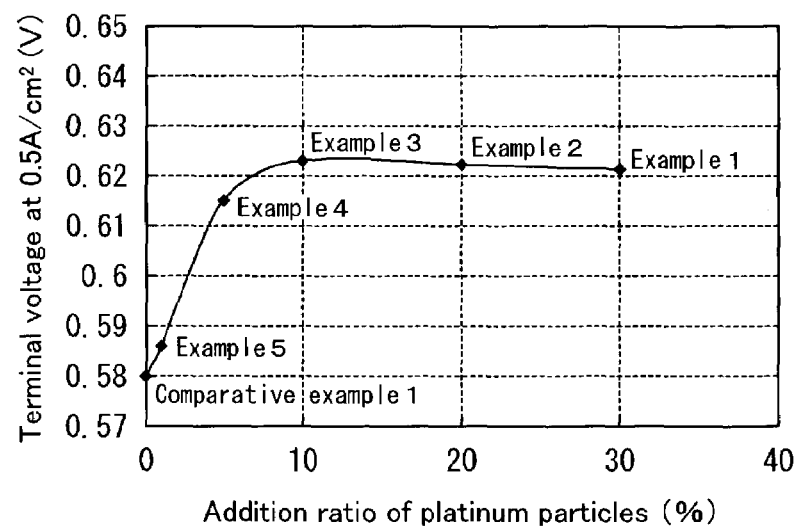
FIG. 2 is a graph showing the relationship of the added amount of platinum particles and the initial terminal voltage in a fuel cell which is using the electrode for polymer electrolyte fuel cells of the present invention.
Figure 3:
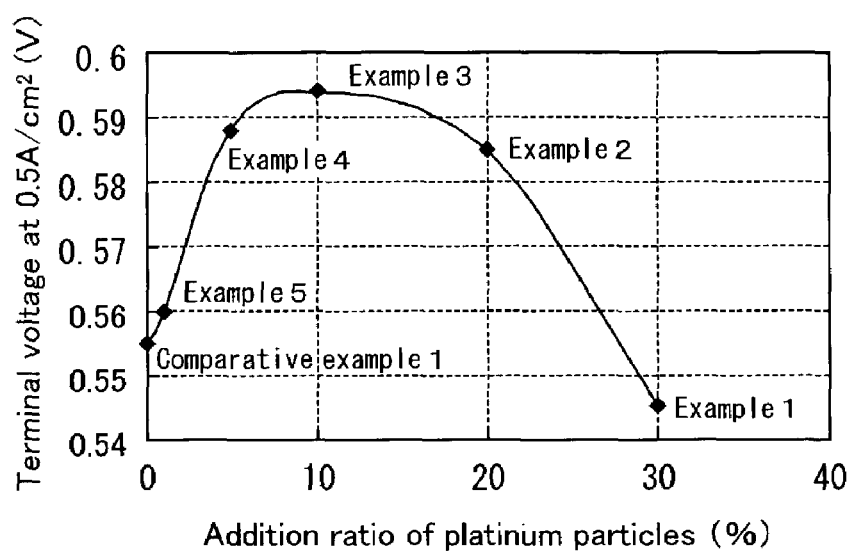
FIG. 3 is a graph showing the relationship of the added amount of platinum particles and the terminal voltage over 500 hours passing from a start of generation in a fuel cell which is using the electrode for polymer electrolyte fuel cells of the present invention.

As is obvious from FIG. 2, the terminal voltage at current density 0.5 A/cm$^2$ in the initial generation can be improved by adding the platinum particles formed by the microemulsion method. Also, as is obvious from FIG. 3, a high terminal voltage can be maintained even after 500 hours pass from the start of power generation, by adding the platinum particles formed by the microemulsion method at a specific ratio. That is to say, it is confirmed that the addition ratio of the platinum particles formed by the microemulsion method should be in a range of from 5 to 20% to the total amount of platinum.

As explained above, in the electrode for polymer electrolyte fuel cells of the present invention, generation efficiency can be improved without increasing the amount of the catalyst which is carried by the electron conducting particles by dispersing the platinum particles formed by the microemulsion method in the ion conducting polymer efficiently.

What is claimed is:

1. A manufacturing method of an electrode for polymer electrolyte fuel cells, the method comprising steps of:
   producing platinum particles having an average particle diameter of from 0.5 to 5 nm by microemulsion method;
   mixing the platinum particles with electron conducting particles carrying platinum thereon and an ion conducting polymer so as to produce an electrode paste in which the platinum particles are contained in a range of from 5 to 20% by weight with respect to the total amount of platinum in the electrode paste; and
   forming the electrode paste into a sheet.

2. The manufacturing method of an electrode for polymer electrolyte fuel cells according to claim 1, wherein surfaces of the platinum particles are protected by a surface active agent by producing the platinum particles by the microemulsion method.

3. The manufacturing method of an electrode for polymer electrolyte fuel cells according to claim 1, wherein the electron conducting particles are carbon black particles having an average particle diameter of from 1 to 8 nm.

4. The manufacturing method of an electrode for polymer electrolyte fuel cells according to claim 1, wherein the electron conducting particles are carbon black particles having an average particle diameter of from 3 to 5 nm.

5. The manufacturing method of an electrode for polymer electrolyte fuel cells according to claim 1, wherein the electron conducting particles have a specific surface area of more than 200 $m^2/g$.

* * * * *